(No Model.)
W. S. GUBELMANN.
WHEEL HUB.
No. 559,486. Patented May 5, 1896.
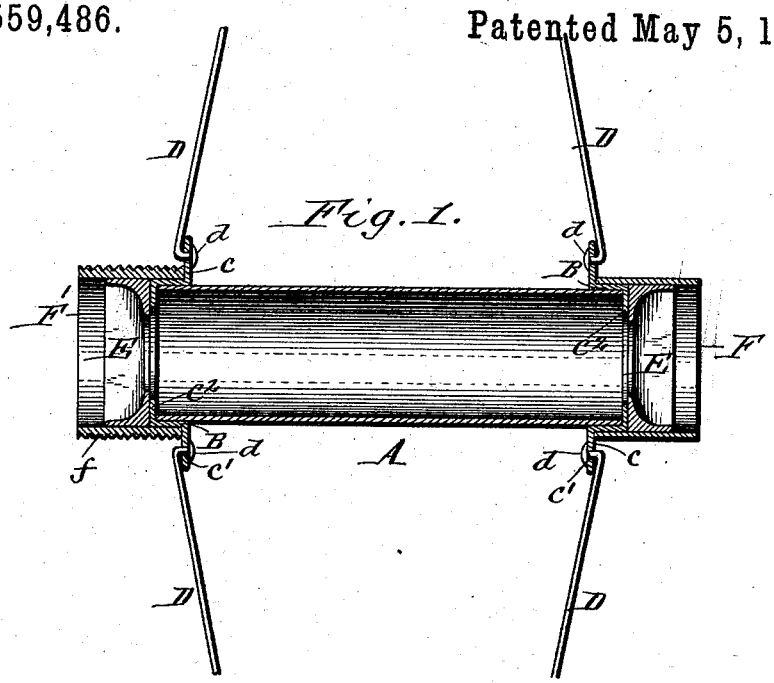
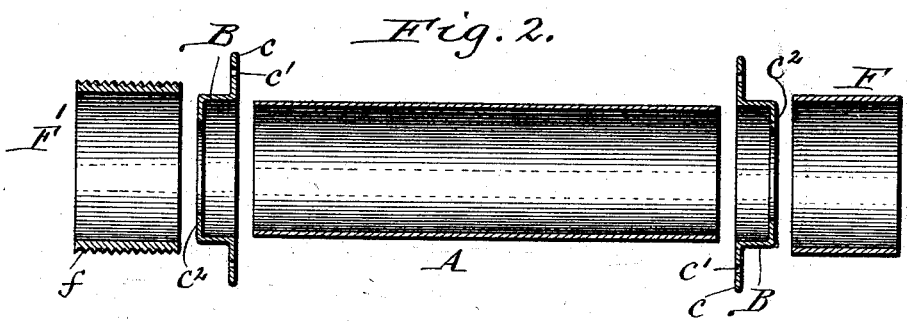
WITNESSES:
Chas. F. Burkhardt
Henry L. Deck
W. S. Gubelmann, INVENTOR.
By Wilhelm Bonner
ATTORNEYS.

UNITED STATES PATENT OFFICE.

WILLIAM S. GUBELMANN, OF BUFFALO, NEW YORK.

WHEEL-HUB.

SPECIFICATION forming part of Letters Patent No. 559,486, dated May 5, 1896.

Application filed October 19, 1895. Serial No. 566,209. (No model.)

*To all whom it may concern:*

Be it known that I, WILLIAM S. GUBELMANN, a citizen of the United States, residing at Buffalo, in the county of Erie and State of New York, have invented new and useful Improvements in Wheel-Hubs, of which the following is a specification.

This invention relates more particularly to sheet-metal wheel-hubs designed to be used with ball-bearings, such as the hubs of bicycle-wheels; and it has for its object to construct a hub of this kind which shall combine lightness and strength, and which can be produced at small cost.

In the accompanying drawings, Figure 1 is a longitudinal section of my improved wheel-hub. Fig. 2 is a similar view showing the parts of the hub separated.

Like letters of reference refer to like parts in both figures.

A is the body of the hub, which consists, preferably, of a piece of steel tubing of the proper length and diameter.

B B represent caps or collars secured to the ends of the body by brazing or other suitable means. Each of these collars is provided at its inner end with an outwardly-extending annular flange $c$, having a circular row of perforations $c'$, through which the inner portions of the spokes D are passed, the spokes having the usual heads or enlargements $d$ at their inner ends for retaining them in the openings of said flanges. Each collar B is provided at its outer end with an inwardly-extending flange $c^2$, which projects inwardly beyond the inner surface of the hollow hub-body, and which preferably abuts against the adjacent end of the body, as shown in Fig. 1. These inwardly-extending flanges form shoulders or abutments, against which the usual inner cones or cups E of the ball-bearings rest, and whereby the same are held against inward displacement in the hub-body. The collars B, with their inwardly and outwardly extending flanges $c\ c^2$, may be stamped or drawn from a single piece of sheet metal.

F F' represent end sleeves or shields, which inclose the ball-bearings and protect the same against dust. These end sleeves surround the flanged collars B and are secured thereto, preferably by brazing. One of these end sleeves—for instance, the sleeve F'—may be provided with an external screw-thread $f$, adapted to engage with a corresponding thread formed in the hub of the usual sprocket-wheel, which latter is not shown in the drawings. If desired, the sleeve F' may be cast in one piece with the hub of the sprocket-wheel.

My improved hub comprises comparatively few parts, which can all be made of sheet metal, rendering the hub both light and strong.

The hub is especially desirable for bicycles and other velocipede-wheels, but may also be used for carriage and wagon wheels.

I claim as my invention—

1. A wheel-hub, consisting of a tubular body, and collars applied to opposite ends of said body and each provided with an outwardly-extending spoke-flange, and an inwardly-projecting flange extending beyond the inner surface of the tubular body and forming internal stop-shoulders for the bearing-cones seated in the ends of the hub, substantially as set forth.

2. A wheel-hub consisting of a central tubular body, collars applied to opposite ends of said body and each provided with an outwardly-extending flange to which the spokes of the wheel are attached and an inwardly-projecting flange extending beyond the inner surface of the tubular body, and independent end sleeves applied to said collars and adapted to inclose the bearing-cones, substantially as set forth.

Witness my hand this 16th day of October, 1895.

WILLIAM S. GUBELMANN.

Witnesses:
 CARL F. GEYER,
 JNO. J. BONNER.